United States Patent Office

2,965,607
Patented Dec. 20, 1960

2,965,607

ETHERS OF EPOXY-SUBSTITUTED PHENOLS AND THEIR POLYMERS

Robert W. Martin, Lafayette, and Calvin E. Pannell, Walnut Creek, Calif., assignors to Shell Oil Company, a corporation of Delaware No Drawing. Filed Apr. 12, 1956, Ser. No. 577,635

14 Claims. (Cl. 260—47)

This invention relates to a new class of epoxy compounds and to a method for their preparation. More particularly, the invention relates to new epoxides derived from phenols substituted with an epoxyhydrocarbyl radical, to a method for their preparation, and to the utilization of the new epoxides, particularly in the preparation of new polymers and resins.

Specifically, the invention provides new and particularly useful ethers of vic-epoxyhydrocarbyl substituted monohydric phenols. As a special embodiment, the invention provides new polyepoxides comprising ethers of poly(vic-epoxyhydrocarbyl) phenols, such as 1 - allyloxy - 2,4-di(epoxypropyl)benzene, and ethers of vic-epoxyhydrocarbyl substituted monohydric phenols and vic-epoxy alcohols, such as, for example, 1-(2,3-epoxypropoxy)-2-(2,3-epoxypropyl)benzene.

The invention further provides an economical way for preparing the above-described ethers which comprises etherifying a phenol substituted with an ethylenically unsaturated radical, such as, for example, allyl phenol, and then treating the resulting ether with a peroxidizing agent to convert the ethylenic group in the side chain of the phenol to an epoxy group.

The invention still further provides polymers of the above-described new ethers, and particularly the new polyepoxide ethers, obtained by reacting the ethers with curing agents, such as amines, polybasic acid anhydrides, $BF_3$ and its complexes, metal salt curing agents and the like.

It is an object of the invention to provide a new class of epoxy compounds and a method for their preparation. It is a further object to provide new ethers of phenols substituted with an ethylenically unsaturated radical. It is a further object to provide new polyepoxides from epoxy-hydrocarbyl-substituted monohydric phenols. It is a further object to provide new phenolic epoxides which possess surprisingly low viscosities. It is a further object to provide new phenolic polyepoxides which have an unexpectedly high degree of activity with epoxy curing agent. It is a further object to provide new phenolic polyepoxides which can be cured to form hard castings which retain their hardness at elevated temperatures. It is a further object to provide new phenolic polyepoxides which can be cured to form products having excellent resistance to solvents and water. It is a further object to provide new ethers of epoxy-hydrocarbyl substituted phenols which are easily produced as pure compounds and are potentially cheap products. Other objects and advantages of the invention will be apparent from the following detailed description thereof.

It has now been discovered that these and other objects may be accomplished by the new epoxides of the present invention which comprise ethers of vic-epoxyhydrocarbyl substituted monohydric phenols. These compounds have been found to possess, due to their unique structural feature such as having an epoxy-substituted radical attached directly to an aromatic ring through carbon instead of the customary oxygen ether linkage, many new and valuable properties. These compounds, for example, have been found to have unexpectedly low viscosities and can be used as diluents for many of the known more viscous polyepoxides. The compounds have also been found to be quite reactive through the epoxy group despite the absence of vicinal ether or ester linkages, and they can be polymerized through the epoxy group to form polymers useful as plasticizers and as additives for lubrication compositions.

The new ethers, wherein phenols are substituted with a plurality of vic-epoxyhydrocarbyl radicals and those wherein the alcohol used in the esterification of the vic-epoxyhydrocarbyl substituted phenols is a vic-epoxy alcohol, are polyepoxides and thus present a distinct group of compounds which are extremely valuable and useful in industry. It is known that liquid polyepoxides derived from polyhydric phenols, such as diglycidyl ether of 2,2-bis(4-hydroxyphenyl) propane (EPon resin 828), are useful in the preparation of castings and coating compositions. The use of these materials however has been limited due to their high viscosities. It has been possible in some cases to reduce the viscosity by the addition of reactive diluents, such as n-butyl glycidyl ether, but the addition of such materials generally causes a loss in some of the desired properties of the cured system. Further, the known liquid polyepoxides derived from the polyhydric phenols are not as reactive with curing agents, such as aromatic polyamines, as would be desirable for many applications. In addition, these known polyepoxides fail to give the degree of hardness, particularly at elevated temperatures, required for many commercial applications. Further, such polyepoxides have been rather difficult and expensive to manufacture commercially.

The new polyepoxides provided by the present invention, however, avoid these difficulties. It has been found, for example, that these new polyepoxides possess surprisingly low viscosity and can be used as such without the addition of diluents. In fact, most of the new polyepoxides have such low viscosity that they may be used as diluents themselves for other types of polyepoxides. It has also been found that increasing the epoxy value by additional epoxyalkyl groups directly to the ring through carbon does not seriously impair the viscosity so that, for the first time, polyepoxides of high epoxy value and low viscosity can be obtained. Further, these new polyepoxides possess an unexpected increase in activity toward curing agents, and particularly the polyamines, and can be used therewith under less stringent conditions. It has also been found that products obtained by curing these new polyepoxides with conventional curing agents are much harder and more resistant than those prepared under similar conditions from known liquid polyepoxides. Further, they retain this hardness at temperatures even as high as 150° C. Advantage is also found in the fact that the new polyepoxides can be prepared as pure compounds and from potentially cheap phenolic materials.

The above-described new epoxides are preferably prepared by etherifying a monohydric phenol substituted with an ethylenically unsaturated radical, such as, for example, allyl phenol, and then treating the resulting ether with a peroxidizing agent, such as peracetic acid, to convert the ethylenic group in the side chain to an epoxy group. As to this process of preparation, it was surprising to find that the epoxidation of the ethylenic group in the side chain goes quite easily and relatively high yields of epoxidized product are obtained in a very short period of time. Heretofore, it has been found that epoxidation of radicals, such as the allylic radical, did not proceed very readily. Further, it was found that the epoxidation of the unsaturated linkages could be accomplished even with epoxy ethers of the phenols as the epoxidation reaction did not affect the epoxy group already in the ether linkage. Thus, 1-(2,3-epoxypropoxy)-2-(2,3-epoxypropyl) benzene can be easily prepared by epoxidizing glycidyl ether of allyl phenol.

As noted, the novel compounds of the invention comprise ethers of vic-epoxy hydrocarbyl-substituted monohydric phenols. The expression "vic-epoxy" as used herein refers to the group

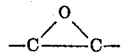

i.e., wherein the oxygen atom is attached to vicinal carbon atoms. "Vic-epoxyhydrocarbyl" radical refers to hydrocarbon radicals, such as aliphatic and cycloaliphatic radicals, containing one or more

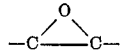

groups. Examples of the vic-epoxyhydrocarbyl substituted monohydric phenols include, among others 2-(2-methyl-1,2-epoxyethyl) phenol,
2-epoxypropylphenol,
2-epoxyethyl phenol,
2,4-di(epoxypropyl)phenol,
2,4,6-tri(epoxypropyl)phenol,
2(epoxypropyl)-4-chlorophenol,
2-(epoxypropyl)-4-bromophenol,
2-(epoxypentadecyl)phenol,
2-(epoxyoctadecyl)phenol,
2-(epoxyeicosadecyl)phenol,
2,4-epoxyoctadecylphenol,
2-(epoxypropyl)naphthol,
2-(epoxypropyl)-4-tert-butylphenol,
2-(epoxypropyl)-3,5-dimethylphenol and the like. Preferred epoxy-substituted phenols are the mono-, di- and tri-vic-epoxyalkyl substituted phenols wherein the epoxyalkyl radical contains no more than 12 carbon atoms and the phenol portion of the molecule contains no more than 15 carbon atoms. The phenol portion of these compounds is preferably derived from unsubstituted phenols, alkyl-substituted phenols, hydroxyalkyl-substituted phenols, alkoxy-substituted phenols and halo-substituted phenols. The di- and tri-vic-epoxyalkyl phenols come under special consideration as they can be used to prepare polyepoxides as noted below.

The alcohols, ethers of which are provided by the present invention, may be aliphatic, cycloaliphatic or heterocyclic and may be saturated, unsaturated or substituted with substituents, such as halogen atoms, alkoxy radicals, epoxy groups and the like. Examples of such alcohols include, among others, butyl alcohol, allyl alcohol, methallyl alcohol, cyclohexenyl alcohol, cyclopentenyl alcohol, furfural alcohol, octyl alcohol, dodecyl alcohol, 3,5,5-tri-methylcyclopentyl alcohol, ethylene glycol, diethylene glycol, glycerol, allyl ether of glycerol, ethoxyethanol, butoxyethanol, allyloxyethanol, and the like. Especially preferred members of this group include the alkanols, alkenols, cycloalkanols, cycloalkenols, alkoxyalkanols, alkoxyalkenols, alkenyloxyalkanols and alkenyloxycycloalkanols containing not more than 10 carbon atoms. The ethylenically unsaturated alcohols come under special consideration as their resulting ethers can be subsequently cured through the ethylenic groups to form a cross-linked polymer.

Examples of these ethers of the epoxy hydrocarbyl phenols include, among others, 1-propoxy-2-(2,3-epoxypropyl) benzene,
1-propoxy-2-epoxyethylbenzene,
1-cyclohexyloxy-2-(2,3-epoxypropyl) benzene,
1-allyloxy-2-(2,3-epoxypropyl) benzene,
1-allyloxy-2-(2,3-epoxypropyl)-4-chlorobenzene,
1-phenoxy-2-(2,3-epoxypropyl)benzene,
1-cyclohexenyl-2-(2,3-epoxypropyl)benzene,
1-furfuryl-2-(2,3-epoxypropyl)benzene,
1-allyloxy-2,4-di(2,3-epoxypropyl)benzene,
1-butoxy-2,4-6-tri(2,3-epoxypropyl)benzene,
1-butoxy-2,4,6-tri(3,4-epoxybutyl)benzene and
1-cyclohexyl-2-chloro-3-(2,3-epoxybutyl)benzene.

As noted above, an especially preferred group of the new ethers are those derived from the poly(epoxy hydrocarbyl) phenols because they are polyepoxides having many valuable properties. Examples of these special ethers include, among others, 1-propoxy-2,4-di(2,3-epoxypropyl)benzene,
1-propoxy-2,4-di(epoxyethyl)benzene,
1-octyloxy-2,4,6-tri(2,3-epoxybutyl)benzene,
1-cyclohexyl-2,5-di(3,4-epoxyoctyl)benzene,
1-allyloxy-2,4,6-tri(2,3-epoxypropyl)benzene,
1-cyclohexenyloxy-2,4,6-tri(2,3-epoxybutyl)benzene,
1-hydroxyethoxy-2,5-di(2,3-epoxypropyl)benzene and the like.

Other preferred polyepoxides are obtained by etherifying any of the above-described vic-epoxyhydrocarbyl substituted phenols with epoxy-substituted alcohols. Examples of these alcohols include, among others, 2,3-epoxypropanol (glycidol),
3,4-epoxybutanol,
2,3-epoxybutanol,
2,3-epoxyhexanol,
epoxidized octadecadienol,
epoxidized dodecadienol,
epoxidized tetradecadienol,
3,4-epoxydihydropyran-5-propanol,
2,3-dimethyl-4,5-epoxyoctanol,
2-methoxy-4,5-epoxyoctanol,
3,4-epoxy-5-chlorocyclohexanol,
2,3-epoxypropoxypropanol,
2,3-epoxypropoxyhexanol,
4-(2,3-epoxypropoxy) heptanol,
2,3-epoxydodecanol and the like.

Preferred epoxy-substituted alcohols are the epoxy-substituted aliphatic and cycloaliphatic monohydric alcohols containing from 3 to 15 carbon atoms, such as 2,3-epoxypropanol, 3,4-epoxybutanol, 3,4-epoxydodecanol, 2-methyl-2,3-epoxypropanol, 2,3-epoxycyclohexanol, 2,3-epoxypropoxyethanol, 2,3-epoxypropoxyoctanol, and the like.

Especially preferred epoxy-substituted alcohols are the epoxyalkanols, epoxyalkoxyalkanols, epoxycycloalkanols and epoxyalkoxy-cycloalkanols, and particularly those containing not more than 12 carbon atoms, such as 2,3-epoxypropanol, 3,4 - epoxyhexanol, 2,3 - epoxypropoxyoctanol, 2,3-epoxy-5-octanol, 2,3-epoxy-dodecanol, 3,4-epoxycyclohexanol, 2,3-epoxypropoxy-4-cyclohexanol, and the like.

Of special interest are the monoepoxy-substituted alkanols containing from 3 to 8 carbon atoms and having the epoxy group in the terminal position. 2,3-alkanols, such as 2,3-epoxypropanol, are of particular interest, particularly because of the ease of preparation of their ethers as well as the superior properties possessed by such ethers.

Examples of vic-epoxy ethers of the epoxyhydrocarbyl phenols include, among others, 1-(2,3-epoxypropoxy)-2-(2,3-epoxypropyl)benzene,
1,(2,3-epoxypropoxy)-2-(epoxyethyl)benzene,
1-(3,4-epoxybutoxy)-2-(3,4-epoxybutyl)benzene,
1-(2,3-epoxycyclohexyloxy)2-(2,3-epoxypropyl)benzene,
1-(2,3-epoxypropoxy)-2-(2,3-epoxycyclohexyl)benzene,
1-(2,3-epoxypropoxy)-2,6-di(2,3-epoxypropyl)benzene,
1-(2,3-epoxypropoxy)-2,4,6-tri(2,3-epoxypropyl)benzene,
1-(2,3-epoxypropoxy)-3-(7,8-epoxypentadecyl)benzene,
1-(2,3-epoxypropoxy)-4-(5,6-epoxytetradecyl)benzene, 1 - (2,3 - epoxypropoxy) - 3 - (5,6,8,9-diepoxyoctadecyl)-
benzene,
1-(3,4-epoxybutoxy)-3-(5,6-epoxypentadecyl)benzene,
1 - (epoxypropoxypropoxy)2,2,4 - di(3,4 - epoxydecyl)-
benzene,
1-(2,3-epoxypropoxy)-2-(2,3-epoxypropyl)naphthalene,
1-(2,3-epoxypropoxy)-3-(3,4-epoxydecyl)naphthalene,
1-(2,3-epoxycyclohexyloxy)-3-2,3-epoxybutyl)benzene,
di(2,3-epoxypropylphenyl) ether of ethylene glycol,
tri(3,4-epoxybutylphenyl) ether of glycerol,
di(3,4-epoxydecylphenyl) ether of 1,2,6-hexanetriol,
di(2,3-epoxypropylphenyl) ether of diethylene glycol,
di(2,3-epoxypropylphenyl) ether of propylene glycol,
1-(2,3-epoxypropoxy)-2-(epoxyethyl)benzene,
1-(2,3-epoxypropoxy)-2-(1,2-epoxyhexyl)benzene.

Particularly preferred ethers of the present invention include ethers of the formula

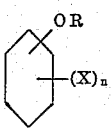

wherein R is a hydrocarbon radical, preferably containing no more than 12 carbon atoms, X is an epoxyalkyl radical, preferably containing no more than 8 carbon atoms, n is 2 to 3, and the remaining groups attached to the ring may be hydrogen, chlorine or lower alkyl radicals, ethers of the formula

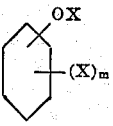

wherein X is an epoxyalkyl radical, preferably containing no more than 8 carbon atoms, m is 1 to 3, and the remaining groups attached to the ring may be hydrogen, chlorine or lower alkyl groups, and ethers of the formula

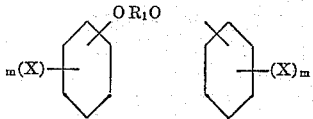

wherein $R_1$ is a bivalent radical derived from a dihydric alcohol by removing the OH groups, and preferably an alkanediol or thioalkanediol, X is an epoxyalkyl radical, preferably containing no more than 8 carbon atoms, m is 1 to 3, and the remaining groups attached to the ring may be hydrogen, chlorine or lower alkyl groups.

The novel compounds of the invention may be prepared by a variety of methods. They may be prepared, for example, by etherifying a phenol substituted with an ethylenically unsaturated radical with the desired alcohol and then treating the resulting ether with a peroxidizing agent to convert the ethylenic group in the side chain to an epoxy group.

The phenols substituted with unsaturated radicals which may be used in such a reaction may be exemplified by the following: 2-allylphenol, 2-isopropenylphenol, 3-vinylphenol, 3,5-dibromo-4-vinylphenol, 2-vinylphenol, 3-allylphenol, 4-allylphenol, 3-vinylphenol, 3,5-dibromo-4-vinylphenol, 2-(1-propenyl)phenol, 3-(1-propenyl)phenol, 2 - (2 - butenyl)phenol, 2 - (1 - ethylpropenyl)phenol, 2-(methylpropenyl)phenol, 2-methoxy - 3 - allylphenol, 2-butyl-3-propenylphenol, 2-allyl-6-methylphenol, 2-allyl-4 - methylphenol, 2,6-diallylphenol, 2-allyl-4,6-dimethylphenol, 2,6-diallyl-3-methylphenol, 2-allyl-4-methyl-6-propylphenol, 2 - allyl - 3,5,6 - trimethylphenol, 2 - allyl-6-chlorophenol, 2-allyl-4-isohexylphenol, 2-allyl-5-hydroxyphenol, 2-allyl-6-methoxyphenol, 2,5-diallyl-5-butoxyphenol, 2,4,6-triallylphenol, 2-allyl-4-acetoxyphenol, 2,4,6 - triallyl - 3 - allyloxyphenol, 4-acetyl-2-allyl-6-methoxyphenol, 2-allyl-6-carboethoxyphenol, 2-allyl-1-naphthol, 1-allyl-2-naphthol, 2-allyl-4-phenylphenol, 2-allyl-5-hydroxy-4-nitrophenol, 2-methallylphenol, 2,6-dimethallylphenol, 2-crotylphenol, 4-crotyl-2,6-dichlorophenol, 2-allyl-4-phenylazophenol, 2-carbomethoxy-6-methyl-4-(2-phenylallyl)phenol, 2-(2-cyclohexenyl)phenol, and the like.

Cardanol, obtainable in known manner from cashew nut shell liquid, is a convenient source of phenols containing an ethylenically unsaturated side chain. Mixed grades of cardanol containing about equal amounts of m-(8-pentadecenyl) phenol and a phenol with a 15 carbon atom side chain having two double bonds similarly removed from the aromatic nucleus are available from Irvington Varnish and Insulator Co. Also available is an essentially pure grade of m-(8-pentadecenyl)phenol.

The allylic phenols constitute a special sub-class of desirable reactants for preparation of ethers. The allylic phenols have an olefinic double bond linkage between the second and third (the beta and gamma) carbon atoms of the substituent group which preferably contain 3 to 10 carbon atoms. When prepared by the easily effected Claisen rearrangement, these allylic phenols have the allylic substituent group or groups on the 2- or 2- and 6-positions of the phenol with respect to the phenolic hydroxyl group or groups. The other phenol reactants used in preparing the ethers are obtainable by known, though generally more complex, methods of synthesis. See, for example, volume VI of Beilstein's Handbuch der Organischen Chemie for reference to publications on the various methods of synthesis of the phenolic reactants.

Vinyl phenols also constitute a special sub-class of desirable reactants for preparation of the ethers.

The esterification of the unsaturated phenols with the desired alcohol may be accomplished by any conventional method for preparation of phenol ethers. The preferred method comprises reacting the phenol with a halide corresponding to the desired alcohol in the presence of sodium hydroxide. 1-butoxy-2-propenylbenzene may be prepared by this method, for example, by reacting 1 mole of 2-propenylphenol with 1 mole of butyl bromide in the presence of 1 mole of NaOH. This type of esterification is preferably conducted at temperatures ranging from about 50° C. to 150° C. in the presence of suitable solvents, such as benzene or toluene. The ethers may be recovered by any suitable means, such as distillation, extraction and the like. The epoxy ethers of the above-described unsaturated-substituted aromatic compounds are preferably obtained by reacting the said aromatic compound with a halo-epoxy-substituted alkane or a dihalo-hydroxy-substituted alkane in an alkaline medium.

The expression "halo-epoxy-substituted alkanes" as used herein refers to those alkanes having a 1,2-epoxy group, i.e., a

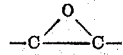

group attached directly to a halogen-bearing carbon atom, such as, for example, epichlorohydrin, epibromohydrin, 1,4-dichloro-2,3-epoxybutane, 1-chlor-2,3-epoxypentane, and the like. The expression "dihalo-hydroxy-substituted alkanes" as used herein refers to those alkanes having a series of three carbon atoms one of which is attached to a halogen atom, the next is attached to a hydroxyl group and the last is attached to a halogen atom, such as, for example, 1,3-dichloro-2-hydroxypropane, 2,4-dibromo-3-hydroxypentane, 2,3-dichloro - 3 - hydroxybutane, and the like. Epichlorohydrin comes under special consideration because of its low cost and because of the superior properties of the epoxides obtained therefrom.

The halo-epoxy-substituted alkane or dihalo-hydroxy-substituted alkane and the unsaturated aromatic compound are preferably reacted in chemical equivalent ratios varying from about 1:1 to 1.5:1. As used herein, "chemical equivalent" amount as used in reference to these reactants refers to the amount of the reactants needed to furnish one mole of the halo-epoxy-substituted alkane or dihalo-hydroxy-substituted alkane for every OH group of the phenol to be reacted.

The desired alkalinity is obtained by adding basic substances, such as sodium or potassium hydroxide. The alkali is employed in at least chemical equivalent amounts, e.g., one mole of alkali for every mole of the halo-epoxy-substituted alkane or dihalo-hydroxy substituted alkane and is preferably utilized near the equivalent amount.

The above reaction is preferably conducted by heating the mixture at temperatures ranging from about 50° C. to 150° C., and more preferably from about 80° C. to 125° C. Atmospheric, superatmospheric, or subatmospheric pressures may be utilized as desired.

The water formed in the reaction may be removed during or at the end of the reaction. At the completion of the reaction, the water and excess reactants, such as excess halo-epoxy-substituted alkanes are preferably removed by distillation and the residue that remains then treated with an appropriate solvent, such as benzene, and filtered to remove the salt. The product that remains may then be purified by any suitable method, such as distillation, extraction, and the like.

The preparation of ethers of the unsaturated phenols is illustrated below:

2-ALLYLPHENYL GLYCIDYL ETHER

A mixture of 240 parts of 2-allylphenol and 1284 parts of epichlorohydrin was heated to reflux and then 72 parts of sodium hydroxide as a 40% aqueous solution was added dropwise during one hour's time. The caustic was added at such a rate that the temperature was about 115° C. to 117° C. After completing the addition of caustic, the reaction mixture was heated for another one-half hour under reflux. The reaction mixture was then cooled to room temperature and the formed salt removed by filtration. Unreacted epichlorohydrin was removed from the filtrate by distillation and the desired 2-allylphenyl glycidyl ether recovered as a distillate boiling at about 100–103° C. under 0.6 mm. Hg pressure.

2,6-DIALLYLPHENYL GLYCIDYL ETHER 2,6-diallyphenyl glycidyl ether was prepared in the same manner as above by treating a mixture of 87 parts of 2,6-diallylphenol and 462.5 parts of epichlorohydrin with 40 parts of sodium hydroxide as a 40% aqueous solution. There was obtained a 78% yield of the ether which was a colorless liquid boiling at about 126–129° C. at 0.6 mm. Hg.

The epoxidation of the unsaturated radical attached to the benzene ring may be advantageously carried out by reacting epoxy ether of the substituted phenol with an epoxidizing agent. Organic peracids, such as peracetic acid, perbenzoic acid, monoperphthalic acid and the like, are preferred agents for this reaction.

The amount of the epoxidizing agent employed will vary over a considerable range depending upon the type of product desired. In general, one should employ at least one mole of the oxidizing agent, such as described above, for every ethylenic group to be epoxidized. Thus, to produce glycidyl o-epoxypropylphenyl ether, one should react one mole of glycidyl o-allylphenyl ether with approximately one mole of the epoxidizing agent. In some cases, it is rather difficult to effect expoxidation of all of the ethylenic groups and if a completely epoxidized product is required, additional epoxidizing agent and/or longer reaction periods may be required.

It is preferred to carry out the epoxidation reaction in a suitable mutual solvent for the reactants and product. Chloroform is an especially useful solvent for the purpose, but other materials such as ethyl ether, dichloromethane, benzene, ethyl acetate, etc., and the like, may be used. It is not necessary to operate under anhydrous conditions, but the amount of water present should be limited so as to avoid excessive hydrolysis of the epoxy group or groups. Up to 25% water in the reaction mixture may be tolerated.

The temperature employed during the epoxidation may vary over a considerable range depending upon the type of reactants and oxidizing agent selected. It is generally desirable to maintain the temperature between −20° C. to 60° C. and more preferably between 10° C. and 40° C. Atmospheric, superatmospheric or subatmospheric pressures may be employed as desired.

The epoxidized products obtained by this method may be recovered from the reaction mixture by any convenient means known to the art, such as distillation, extraction, fractional precipitation, filtration, and the like.

The new ethers of the present invention are water white to slightly yellow fluid liquids to semi-solids depending upon the type and length of the ether radicals. They are substantially free of chlorine and are soluble in a great many oils and solvents and are compatible with many synthetic resins and polymers. The ethers are thus particularly valuable as additives for vinyl polymers such as polyvinyl halide, as they act to both plasticize the resin as well as stabilize it against decomposition by heat and light. The new ethers are also valuable as additives for lubricating composition both in the form of monomers and in the form of their linear polymers.

The new ethers are also useful in the preparation of valuable polymeric products. For this purpose they may be polymerized by themselves or with other types of epoxy-containing polymers. The new ethers possessing only one epoxy group form linear polymers when contacted with catalysts, such as aluminum chloride, aluminum bromide, bismuth trichloride, zinc chloride, and boron trifluoride complexes. About 1% to 10% by weight of the catalyst is usually sufficient to effect the desired degree of polymerization. It is generally preferred to accomplish the polymerization using this type of catalyst in a solvent, such as petroleum ether, chloroform, benzene, isopropyl ether, and the like. The temperature employed will generally vary between about −50° C. to 100° C. and more preferably between 0° C. and 60° C. The lower temperatures tend to give waxy solid type of linear polymers, while the higher temperatures tend to give viscous liquid to soft solid polymers. These polymers, both liquid and solid, are useful as additives for lubricating composition, both as pour point depressants and as viscosity index improvers.

The new polyepoxides of the invention are distinguished from the monoepoxy compounds of the invention in that they may be cured with hardening agents, such as amines, anhydrides, BF$_3$ and its complexes and certain metal salts, to form hard cross-linked insoluble products, the polymers from the monoepoxy compounds being soluble thermoplastic materials.

The new polyepoxides may also be further reacted with materials to form higher molecular weight products which also may be cured with hardening agents to form the hard cross-linked insoluble products. Such higher molecular weight compounds may be obtained, for example, by reacting the above-described new polyepoxides with polyhydric compounds. In this case, the polyhydric compound reacts with the vic-epoxy groups to form

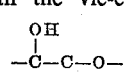

groupings. Higher molecular weight products may be obtained from 1-(2,3-epoxypropoxy)-2-(2,3-epoxypropyl)-benzene, for example, by reacting X moles of that compound with one mole of a polyhydric phenol having X OH groups. Such products have the formula

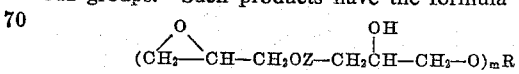

wherein Z is the residue of the 1-(2,3-epoxypropxy)-2-(2,3-epoxypropyl)benzene, R is the residue of the polyhydric phenol and m is an integer representing the number of OH groups on the polyhydric phenol molecule. Polyhydric compounds used for this purpose may be any polyhydric phenol, such as resorcinol, 2,2-bis(4-hydroxyphenyl) propane, catechol, hydroquinone, methyl resorcinol, 2,2-bis(4-hydroxyphenyl)butane, and the like.

The condensation reaction described above for preparation of the higher molecular weight products may be accomplished by merely heating the components together in the presence or absence of inert diluents. The condensation reaction is preferably accomplished at temperatures ranging from about 25° C. to 200° C. and more preferably from 150° C. to about 200° C.

If the resulting higher molecular weight products possess less than the desired number of epoxy groups, such as may be the case when the polyhydric phenol is reacted with less than a double molar quantity of the new polyepoxides, additional epoxy groups may be introduced by reacting the higher molecular weight product with additional quantities of the epoxy-forming material, e.g., the epoxy-halo-alkanes, such that there will be one epoxy group for each of the OH groups of the polyhydric phenol to be reacted. Thus, if the higher molecular weight product was obtained by reacting one mole of the 1-(2,3-epoxypropoxy)-2-(2,3-epoxypropyl)benzene with two moles of the dihydric phenol, the resulting higher molecular weight product would then be reacted with approximately two moles of the epoxy-forming material. The halohydrin obtained may then be dehydrohalogenated according to conventional procedure.

The higher molecular weight products produced by the above methods vary from viscous liquids to solids having relatively high melting points. They possess active epoxy groups as well as hydroxyl groups and may be cured or undergo further reaction through either of these functional groups.

The new polyepoxides of the invention and their higher molecular weight products as described above may be cured through the epoxy groups to form valuable polymeric products. They may be polymerized alone or with other polyepoxide materials in a variety of different proportions, such as, for example, with amounts of other polyepoxides varying from 5% to 95% by weight. Polyepoxides that may be copolymerized with these poly-(epoxyhydrocarbyl) benzene-substituted epoxides and higher molecular weight products include, among others, glycidyl polyethers of polyhydric phenols obtained by reacting polyhydric phenols, such as bis-phenol, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyhydric phenols with epichlorohydrin as described above are also referred to as "ethoxyline" resins. See Chemical Week, vol. 69, page 27, for September 8, 1951.

A great variety of different curing agents may be employed in effecting the above-described homo- and copolymerization. Such agents include, among others, carboxylic acids or anhydrides, such as formic acid, oxalic acid, or phthalic anhydride; Friedel-Crafts metal halides, such as aluminum chloride, zinc chloride, ferric chloride or boron trifluoride as well as complexes thereof with ethers, amines, acid anhydrides, ketones, diazonium salts, etc.; phosphoric acid and partial esters thereof including n-butyl orthophosphate, diethyl orthophosphate and hexaethyl tetraphosphate; amino compounds, such as triethylamine, ethylene diamine, diethylamine, diethylene triamine, triethylene tetraamine, dicyandiamide, melamine; and salts of inorganic acids, such as zinc fluoborate, potassium persulfate, nickel fluoborate, and magnesium perchlorate.

The amount of the curing agents employed may vary over a considerable range, such as from 1% to 200% by weight of the polyepoxide, with the exact range depending on the particular type of agent selected. With curing agents having replaceable hydrogen, such as the amine agents, amounts of agent generally employed vary up to and including equivalent proportions, i.e., sufficient curing agent to furnish a replaceable hydrogen atom for every epoxy group to be reacted. In most cases, satisfactory cures are obtained with amounts varying from 1% to 25% by weight of the materials being polymerized. With the phosphoric acid and esters, particularly preferred amounts vary from about 1% to 10% by weight. The amino compounds are preferably employed in amounts varying from about 3% to 25% and the salts of the inorganic acids, such as the salts of fluoboric acid, are preferably employed in amounts varying from about 3% to 20% by weight. The other curing agents are preferably employed in amounts varying from 1% to 20%.

The higher molecular weight hydroxy-containing ethers may also be cured through the hydroxy group by the addition of appropriate amounts, e.g., 1% to 25% by weight of polybasic acids or anhydrides, polyisocyanates, and the like.

The cure of the polyepoxides is preferably effected by mixing the curing agent with the polyepoxide and heating. Curing temperatures range generally from room temperature to about 200° C., the exact range preferably depending on the curing agent selected. Active curing agents, such as the aliphatic amines may be utilized, for example, at lower temperatures, such as from room temperature to about 60° C. Less active materials, such as polybasic anhydrides and acids, generally require higher temperatures, such as temperatures ranging from about 60° C. to 150° C. Aromatic amines are preferably employed at the higher temperatures, e.g., temperatures ranging from 60° C. to 150° C.

If the new polyepoxides of the poly(hydrocarbyl) benzene-substituted alcohols or phenols and their higher molecular weight derivatives are to be used in the preparation of castings or pottings, the curing agent and the epoxy material are generally combined together and then poured into the mold or casting which may if desired contain additional material, such as electrical wires or apparatus, and the mixture heated to effect the cure.

The new polyepoxides and their higher molecular weight derivatives may also be employed with the aforedescribed curing agents to prepare improved surface coating compositions of the air-drying or baking type. In utilizing the products for this application, it is generally desirable to combine the epoxy material and curing agent with the desired solvents, and, if desired, other film-forming materials and driers, and then apply the resulting mixture to the surface to be coated. Film-forming materials that can be used with the epoxy material in this manner include the drying oils, such as tung oil, linseed oil, dehydrated castor oil, soyabean oil, and the like; cellulose derivatives such as cellulose nitrate, cellulose acetate, cellulose acetate butyrate, cellulose propionate, ethyl cellulose, and mixtures thereof; and vinyl polymers, such as polymers of vinyl chloride, vinylidene chloride, methyl methacrylate, diallyl phthalate, and the like. The coatings prepared in this manner may be allowed to set to a hard finish at room temperature or heat may be applied to hasten the cure.

Because of their low viscosities, the liquid polyepoxides of the invention can be used to prepare solventless varnishes. In this application, the liquid polyepoxides and other desired coating resins are combined with the hardening agent and the mixture applied as a coating.

The higher molecular weight hydroxy-containing derivatives of the new polyepoxides as described above are particularly suited for use in preparing coating compositions as described above, as they may be reacted through the hydroxyl group or groups with drying oil fatty acids or may be cured through the hydroxyl groups with compounds such as methylol urea or melamines or diisocyanates.

The new polyepoxides and their higher molecular weight derivatives may also be employed with the curing agents to prepare valuable adhesive and impregnating compositions. If the new monomeric products are used for this application they may be used as such without the use of a diluent, while the higher molecular weight products may be used with solvents, such as benzene, toluene, acetonitrile, and the like. The curing agent is then added to the spreadable mixture and the mixture applied to the desired surface.

In addition to their use in forming the above-described polymeric products, the new polyepoxides and their higher molecular weight derivatives may be used as stabilizing agents for various halogen-containing polymers, and particularly the vinyl halide polymers. These products are compatible with the polymers and in combination therewith give good resistance to discoloration by heat and light. These products may be used as stabilizers, alone or in combination with other stabilizing agents, such as ureas and metal salts as Cd salts. In most cases, the products are effective as stabilizers in amounts varying from about .1% to 5% by weight of the polymer being stabilized. The epoxy material may be combined with the halogen-containing polymer by any suitable method, such as by dissolving the products in a suitable solvent or by milling the products together on a suitable roll mill.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

Example I

This example illustrates the preparation and some of the properties of 1-epoxypropoxy-2-epoxypropylbenzene.

190 parts of O-allylphenyl glycidyl ether prepared as shown above was added to 180 parts of chloroform. 163 parts of a 45% peracetic acid solution was then added to the mixture and the resulting mixture maintained at 30° C. for 2 hours and then allowed to stand in a water bath at 27° C. for 12 hours. The reaction mixture was then extracted with water, sodium carbonate, water and then filtered and dried. Chloroform was then taken off and the product distilled to yield a slightly yellow free flowing liquid having a boiling point of 145–149° C./.8 mm. pressure. The product was identified as 1-epoxypropoxy-2-epoxypropylbenzene.

|  | Calc. | Found |
| --- | --- | --- |
| C | 70.0 | 69.8 |
| H | 6.8 | 6.8 |
| M.W. | 206 | 205 |
| Epoxy value eq/100 g | .97 | .902 |
| Cl |  | .31 |

The product had a viscosity of .48 poise at 25° C. as compared to a viscosity of 100–150 poises for the diglycidyl ether of bis-phenol.

100 parts of 1-epoxypropoxy-2-epoxypropylbenzene produced above was mixed with 20 parts of diethylene triamine. The mixture gelled at room temperature in 6 hours. The casting formed by cure at room temperature had a Barcol hardness of 23–27 at 72 hours. A similar casting prepared by the room temperature cure of diglycidyl ether of bis(4-hydroxyphenyl)propane had a hardness of only 6.

100 parts of the 1-epoxypropoxy-2-epoxypropylbenzene was mixed with 27 parts of meta-phenylene diamine and the mixture heated at 150° C. for two hours. The hardness of the resulting castings at various temperatures is shown below in comparison to the hardness of similar castings prepared from diglycidyl ether of bis(4-hydroxyphenyl) propane:

| Resin | Barcol Hardness | | | | |
| --- | --- | --- | --- | --- | --- |
|  | R.T. | 60° C. | 80° C. | 100° C. | 120° C. |
| 1-Epoxypropoxy-2-epoxypropylbenzene (A) | 43–50 | 40–41 | 38 | 33–34 | 27 |
| Diglycidyl Ether of bis(4-hydroxy phenyl) propane (B) | 40 | 32 | 27 | 21 | 10 |

The castings prepared by use of meta-phenylene diamine were then put in boiling water for 3 hours and the Barcol hardness and gain in weight determined. A similar test was made using boiling acetone. The results are shown below in comparison to those obtained by using castings prepared from diglycidyl ether of bis-(4-hydroxyphenyl)propane and meta-phenylene diamine:

| Resin | After 3 hrs. boiling water | | After 3 hrs. boiling acetone | |
| --- | --- | --- | --- | --- |
|  | Barcol Hardness | Gain in Weight | Barcol Hardness | Gain in Weight |
| (A) | 45 | 0.29 | 47 | 0.02 |
| (B) | 38 | 1.00 | 36 | 1.20 |

100 part portions of 1-epoxypropoxy-2-epoxypropylbenzene produced above was combined with 20 parts of diethylene triamine, 27.2 parts of meta-phenylene diamine, 7 parts BF$_3$-ethyl amine and 140 parts of hexahydrophthalic anhydride and the mixture heated at 150° C. for 2 hours. The hardness of the resulting castings was then determined. The results are shown below in comparison to those obtained with diglycidyl ether of bis(4-hydroxyphenyl) propane:

| Resin | Curing Agent | | | |
| --- | --- | --- | --- | --- |
|  | DTA[1] | "Cl"[2] | BF$_3$-ethyl ether | Hexahydrophthalic Anhydride |
| 1-Epoxypropoxy-2-epoxypropylbenzene | 42 | 43–50 | 37 | 42 |
| Diglycidyl ether of bis(4-hydroxyphenyl) propane | 37–38 | 40 | 37 | 38 |

[1] DTA = diethylene triamine.
[2] Cl = meta-phenylene diamine.

A glass cloth laminate was prepared by using a mixture of 50 parts of 1-epoxypropoxy-2-epoxypropylbenzene and 50 parts of diglycidyl ether of bis(4-hydroxyphenyl)-propane containing meta-phenylene diamine as the curing agents. Sheets of fiberglass cloth 181-Volan A impregnated with the solution were dried for 30 minutes at 90° C. and then assemblies of 12 piles of superposed cloth were prepared. The assembly was first subjected to contact pressure and then the pressure was increased to 200 p.s.i. The ultimate flexural strength of the laminate was 101,000 p.s.i. compared to 90,000 to 100,000 prepared directly from the glycidyl ether of bis(4-hydroxyphenyl)propane and the flexural strength at 300° F. was 48,000 p.s.i. compared to 45,000 p.s.i. for the one prepared from glycidyl ether of bis(4-hydroxyphenyl)propane.

Example II

This example illustrates the preparation and some of the properties of 1-epoxypropoxy-2,6-di(epoxypropyl)benzene.

90 parts of 2,6-diallylphenyl glycidyl ether prepared as shown above was added to 150 parts of chloroform. 146 parts of a 45% peracetic acid solution was then added to the mixture and the resulting mixture maintained at 30° C. for about 2 hours. The mixture was then allowed to stand in a water bath at 27° C. for about 12 hours. The reaction mixture was then extracted with water, sodium carbonate, water and then filtered and dried. Chloroform was then taken off and the mixture distilled to yield a slightly yellow free flowing liquid having a boiling point of 179° C./≦1.0 mm. Epoxy value 1.042 eq./100 g. (calc. 1.145). The product was identified as 1-epoxypropyl-2,6-di(epoxypropyl)benzene.

100 parts of 1-epoxypropoxy-2,6-di(epoxypropyl)benzene produced above was combined with 22 parts of diethylene triamine and after gelling the mixture heated to 150° C. for 2 hours. The hardness of the resulting casting was determined at various temperatures. The results are shown in the table below in comparison to results obtained from a similar casting prepared from diglycidyl ether of bis(4-hydroxyphenyl) propane:

| Resin | Barcol Hardness | | | | | | |
|---|---|---|---|---|---|---|---|
| | RT | 60° C. | 80° C. | 100° C. | 120° C. | 140° C. | 150° C. |
| 1-epoxypropoxy-2,6-di (epoxypropyl) benzene (A) | 58 | 53 | 50 | 43 | 37 | 29 | 24 |
| diglycidyl ether of bis (4-hydroxyphenyl) propane (B) | 38 | 22 | 16 | 4 | 0 | 0 | 0 |

100 parts of the 1-epoxypropoxy-2,6-di(epoxypropyl)benzene was also combined with 28.2 parts of meta-phenylene diamine and the mixture heated to 150° C. for 2 hours. The Barcol hardness of the resulting casting was determined at various temperatures. The results are shown in the table below in comparison to results obtained from a similar casting prepared from diglycidyl ether of bis(4-hydroxyphenyl)propane:

| Resin | Barcol Hardness | | | | | | |
|---|---|---|---|---|---|---|---|
| | RT | 60° C. | 80° C. | 100° C. | 120° C. | 140° C. | 150° C. |
| 1-epoxypropoxy-2,6-di (epoxypropyl) benzene (A) | 57 | 54 | 52 | 48 | 45 | 41 | 37 |
| diglycidyl ether of bis (4-hydroxyphenyl) propane (B) | 44 | 32 | 27 | 21 | 10 | 0 | 0 |

Example III

This example illustrates the preparation of 1-epoxypropoxy 2,4,6-triepoxypropylbenzene.

30 parts of 2,4,6-triallylphenyl glycidyl ether prepared as shown above was added to 90 parts of chloroform. 82 parts of a 45% peracetic acid solution was then added to the mixture and the resulting mixture maintained at 30° C. for 2 hours and then allowed to stand in a water bath for 12 hours. The reaction mixture was then extracted with water, sodium carbonate, water and then filtered and dried. Chloroform was then taken off to give a free flowing liquid identified as 1-epoxypropoxy-2,4,6-triepoxypropylbenzene. Epoxy value 1.046 eq./100 g. (1.220 eq./100 calc.).

When this product was mixed with 28 parts of meta-phenylene diamine at 150° C. the mixture set up to a hard casting having a Barcol hardness of 64.

When the product was heated with hexahydrophthalic anhydride at 100° C., the mixture formed a hard tough casting.

Example IV

This example illustrates the preparation and some of the properties of epoxidized m-pentadecenylphenyl glycidyl ether.

358 parts of meta-pentadecenylphenyl glycidyl ether is added to 200 parts of chloroform. 163 parts of a 45% peracetic acid solution is then added to the mixture and the resulting mixture maintained at 30° C. for 2 hours and then allowed to stand in a water bath at 27° C. for 12 hours. The mixture is then extracted with water, treated with sodium bicarbonate, water and then filtered and then dried. Chloroform is then taken off and the mixture distilled to yield a white liquid identified as m-epoxypentadecylphenyl glycidyl ether.

When this product is heated with diethylene triamine at 100° C. a hard insoluble casting is obtained.

When the product is heated with an equivalent amount of hexahydrophthalic anhydride, a hard insoluble flexible casting is obtained.

Related products are obtained by replacing the m-pentadecylphenyl glycidyl ether in the above process with equal amounts of each of the following: m-octadecenylphenyl glycidyl ether, m-eicosenylphenyl glycidyl ether and hexadecadienylphenyl glycidyl ether.

Example V

This example illustrates the preparation and some of the properties of epoxidized p-crotylphenyl glycidyl ether.

98 parts of p-crotylphenyl glycidyl ether was added to 100 parts of chloroform. 165 parts of a 45% peracetic acid solution was then added to the mixture and the resulting mixture maintained at 20° C. for 2 hours and then allowed to stand in a water bath at 27° C. for 12 hours. The mixture was then washed and treated as in the preceding example. Chloroform was then taken off and the mixture distilled to give a free flowing liquid identified as epoxidized p-crotylphenyl glycidyl ether. Boiling point 152° C. at ≦1.0 mm., epoxy value: .885 eq./100 g. (.91 calc.), 20/D 1.5272.

The above product was heated with 18.2 parts of diethylene triamine. The resulting casting had a Barcol hardness of 38.

Example VI

This example illustrates the preparation and some of the properties of epoxidized vinylphenyl glycidyl ether.

176 parts of m-vinylphenyl glycidyl ether is added to 150 parts of chloroform. 163 parts of a 45% peracetic acid solution is then added to the mixture and the resulting mixture allowed to stand at 30° C. for 12 hours. The mixture is then washed and treated as in Example IV. Chloroform is then taken off and the mixture distilled to give a liquid identified as epoxyethylphenyl glycidyl ether.

When the product is heated with 30 parts of diethylene triamine at 100° C., a hard, insoluble tough casting is obtained.

When the product is heated with 30 parts of hexahydrophthalic anhydride at 65° C., a hard flexible casting is also obtained.

*Example VII*

This example illustrates the preparation and some of the properties of bis(epoxypropylphenyl) ether of ethylene glycol.

294 parts of bis(allylphenyl) ether of ethylene glycol is added to 150 parts of chloroform. 163 parts of a 45% peracetic acid solution is then added to the mixture and the resulting mixture allowed to stand at 30° C. for 12 hours. The product is then washed and treated as in Example IV. Chloroform is then taken off and the mixture distilled to yield a substantially white liquid identified as the bis(epoxypropylphenyl)ether of ethylene glycol.

100 parts of the bis(epoxypropylphenyl)ether of ethylene glycol prepared above is heated with 15 parts of meta-phenylene diamine at 150° C. for several hours. The resulting product is a very hard tough casting.

Related results are obtained by replacing the bis(allylphenyl) ether of ethylene glycol in the above preparation process with equivalent amounts of each of the following: bis(allylphenyl) ether of 1,5-pentanediol, diethylene glycol, 1,8-octanediol and 1,20-eicosanediol.

*Example VIII*

This example illustrates the preparation and some of the properties of 1-butoxy-2,6-di(epoxypropyl)benzene.

227 parts of 2,6-diallylphenyl butyl ether is added to 200 parts of chloroform and 163 parts of a 45% peracetic acid solution is then added to the mixture and the resulting mixture maintained at 30° C. for 2 hours and then allowed to stand in a water bath at 27° C. for 12 hours. The reaction mixture is then extracted with water, sodium carbonate, water and then filtered and dried. Chloroform was then taken off and the product distilled to yield a free flowing white liquid having a relatively high boiling point.

100 parts of the 1-butoxy-2,6-di(epoxypropyl)benzene is heated with 22 parts of meta-phenylene diamine at 150° C. for 2 hours. The resulting product is a very hard casting which retains its hardness even at elevated temperatures.

The above product also forms hard tough castings when heated with each of the following: diethylene triamine, ethylene diamine and chloromaleic anhydride.

Related results are obtained by replacing the 2,6-diallylphenyl butyl ether in the above preparation process with equivalent amounts of each of the following: 2,6-diallylphenyl octyl ether, 2,6-diallyl phenyl cyclohexyl ether and 2,6-diallylphenyl amyl ether.

*Example IV*

This example illustrates the preparation and some of the properties of the glycidyl ether of 2-epoxypropyl-4,6-dichlorophenol.

235 parts of the glycidyl ether of 2-allyl-4,6-dichlorophenol was added to 250 parts of chloroform and 190 parts of a 45% peracetic acid solution is then added to the mixture and the resulting mixture maintained at 20° C. for 2 hours and then allowed to stand in a water bath at 27° C. for 12 hours. The reaction mixture is then extracted with water, sodium carbonate, water and then filtered and dried. Chloroform was then taken off and the product distilled to yield a free flowing white liquid having a boiling point of 160° C. at ≦1 mm. Epoxy value 0.639 eq./100 g. (0.722 calc.), 20/D 1.5530.

100 parts of the glycidyl ether of 2-epoxypropyl-4,6-dichlorophenol produced above was heated with 17.2 parts of meta-phenylene diamine at 150° C. for 2 hours. The resulting product was a hard casting having a Barcol hardness of 49 and excellent resistance to solvents.

Related results are obtained by replacing the glycidyl ether of 2-allyl-4,6-dichlorophenol in the above-described preparation process with equivalent amounts of each of the following: 2-(2-propenyl)-4,6-bromophenol, 2-(2-butenyl)-4,6-dichlorophenol and 2-(hexenyl)-4,6-dichlorophenol.

*Example X*

This example illustrates the preparation and some of the properties of the glycidyl ether of 2-epoxypropyl-4-tert-butylphenol.

240 parts of the glycidyl ether of 2-allyl-4-tert-butylphenol is added to 200 parts of chloroform and 163 parts of a 45% peracetic acid solution was then added to the mixture and the resulting mixture maintained at 30° C. for 2 hours and then allowed to stand in a water bath at 27° C. for 12 hours. The reaction mixture was then extracted with water, sodium carbonate, water and then filtered and dried. Chloroform was then taken off and the product distilled to yield a free flowing liquid. The product was identified as the glycidyl ether of 2-epoxypropyl-4-tert-butylphenol.

100 parts of the glycidyl ether produced above is heated with 20 parts of meta-phenylene diamine at 150° C. for 2 hours. The resulting product is a very hard casting which retains its hardness at elevated temperatures.

Related results are obtained by replacing the glycidyl ether of 2-allyl-4-tert-butylphenol in the above preparation process with equivalent amounts of each of the following: glycidyl ether of 2-methallyl-4-tert-amylphenol, glycidyl ether of 2-(2-butenyl)-4-isopropylphenol and glycidyl ether of 2-ethallyl-4-isoamylphenol.

*Example XI*

This example illustrates the preparation of methyl ether of 2-(epoxypropyl)phenol.

148 parts of the methyl ether of 2-allylphenol is added to 200 parts of chloroform and 163 parts of a 45% peracetic acid solution is then added to the mixture and the resulting mixture maintained at 30° C. for 2 hours and then allowed to stand in a water bath at 27° C. for 12 hours. The reaction mixture was then extracted with water, sodium carbonate, water and then filtered and dried. Chloroform was then taken off and the product distilled to yield a free flowing liquid. The product is identified as methyl ether of 2-epoxypropylphenol. The ether may be converted to a thick viscous liquid when treated with 2% stannous chloride. The liquid is useful as a plasticizer and as an additive for lubricating compositions.

Related results are obtained by replacing the methyl ether of 2-allylphenol in the above process with equivalent amounts of each of the following: butyl ether of 2-methallylphenol, isooctyl ether of 2-butenylphenol and isoamyl ether of 2-chloroallylphenol.

*Example XII*

This example illustrates the preparation of methyl ether of 2-epoxypropyl-4,6-dimethylolphenol.

208 parts of methyl ether of 2-allyl-4,6-dimethylolphenol (prepared as shown in U.S. 2,707,715) is added to 200 parts of chloroform and 163 parts of a 45% peracetic acid solution is then added to the mixture and the resulting mixture maintained at 30° C. for 2 hours and then allowed to stand in a water bath at 27° C. for 12 hours. The reaction mixture is then extracted with water, sodium carbonate, water and then filtered and dried. Chloroform is then taken off and the product distilled to yield a free flowing liquid. The product is identified as methyl ether of 2-epoxypropyl-4,6-dimethylolphenol. This product can also be polymerized to thick viscous liquid useful as plasticizers for vinyl chloride polymers by the addition of stannous chloride and aluminum chloride.

Related results are obtained by replacing the methyl ether of 2-allyl-4,6-dimethylolphenol with equivalent amounts of each of the following: hydroxyethyl ether of 2-allyl-4,6-dimethylolphenol and butyl ether of 2-methallyl-4-methylolphenol.

*Example XIII*

This example illustrates the preparation of a mixture of ethers of the formula

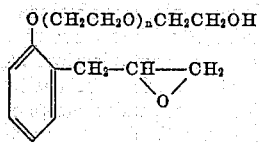

wherein $n$ is 6 to 8.

530 parts of the hydroxy-substituted polyethoxy ether of allylphenol which is obtained by reacting allylphenol with ethylene oxide is added to 200 parts of chloroform. 163 parts of a 45% peracetic acid solution is then added to the mixture and the resulting mixture maintained at 30° C. for 2 hours and then allowed to stand in a water bath at 27° C. for 12 hours. The reaction mixture is then extracted with water, sodium carbonate, water and then filtered and dried. Chloroform is then taken off and the product distilled to yield a product identified as a mixture of ethers having the above-described formula. This mixture can be esterified with drying oils, such as soyabean oil fatty acids, to form synthetic drying oils useful in surface coatings, and can be polymerized through the epoxy group to form linear polymers useful as plasticizers.

Related results are obtained by replacing the hydroxy-substituted polyethoxy ether of allyl phenol in the above process with equivalent amounts of each of the following: hydroxy-substituted polypropoxy ether of allyl phenol (obtained by reacting allyl phenol with propylene oxide) and the hydroxy-substituted polyethoxy ether of methallylphenol (obtained by reacting methallyl phenol with ethylene oxide).

*Example XIV*

This example illustrates the preparation and some of the properties of chloropropyl ether of 2,6-di(epoxypropyl)phenol.

100 parts of chloropropyl ether of 2,6-diallylphenol is added to 250 parts of chloroform. 163 parts of a 45% peracetic acid solution is then added to the mixture and the resulting mixture maintained at 20° C. for 2 hours and allowed to stand in a water bath at 30° C. for 12 hours. The reaction mixture is then extracted with water, filtered and dried. Chloroform is then taken off and the product distilled to yield a white liquid identified as chloropropyl ether of 2,6-di(epoxypropyl)phenol.

100 parts of the above-described product is heated with meta-phenylene diamine at 150° C. for 2 hours. The resulting product is a hard tough casting having good resistance to solvents.

Related results are obtained by replacing the chloropropyl ether of 2,6-diallylphenol in the above process with equivalent amounts of each of the following: chlorobutyl ether of 2,6-dimethallylphenol and chlorooctyl ether of 2,4,6-triallylphenol.

*Example XV*

This example illustrates the preparation of a glycidyl ether of 2,6-di(epoxypropyl)-4-methoxyphenol.

104 parts of glycidyl ether of 2,6-diallyl-4-methoxyphenol is added to 250 parts of chloroform. 163 parts of a 45% peracetic acid solution is then added to the mixture and the resulting mixture maintained at 20° C. for 2 hours and then allowed to stand in a water bath at 30° C. for 12 hours. The resulting mixture is then extracted with water, filtered and dried. Chloroform is then taken off and the product distilled to yield a white liquid identified as glycidyl ether of 2,6-di(epoxypropyl)-4-methoxyphenol. When heated with meta-phenylene diamine, hexahydrophthalic anhydride and boron-trifluoride ethyl ether complex, a hard tough casting is obtained.

Related results are obtained by replacing the glycidyl ether of 2,6-diallyl-4-methoxyphenol in the above process with equivalent amounts of glycidyl ether of 2,6-diallyl-4-octyloxyphenol.

*Example XVI*

1-epoxypropoxy-2-epoxypropylbenzene produced in Example I was cured in combination with a low molecular weight liquid reaction product of epichlorohydrin and 2,2-bis(4-hydroxyphenoyl)propane (Epon 828) having a viscosity of 100–150 poises at 25° C. using metaphenylene diamine as the curing agent. The viscosities of the mixture before curing and the properties of the resulting castings are shown in the following table:

| Resin | Viscosity Poises at 25° C. | Hardness | | | | | | 3-Hrs. Boiling Water | | 3 Hrs. Boiling Acetone | |
|---|---|---|---|---|---|---|---|---|---|---|---|
| | | RT | 60° C. | 80° C. | 100° C. | 120° C. | 140° C. | Hardness | Percent Wt. Change | Hardness | Percent Wt. Change |
| Epon 828 | 164 | 40 | 32 | 27 | 21 | 10 | 3 | 38 | 1.00 | 36 | 1.20 |
| Epon 828 (75), Ex. 1 Resin (25) | 18 | 44 | 38 | 34 | 26 | 18 | 7 | 41 | 0.32 | 42 | 0.31 |
| Epon 828 (50), Ex. 1 Resin (50) | 2.6 | 46 | 40 | 36 | 31 | 23 | 12 | 44 | 0.29 | 46 | 0.13 |
| Epon 828 (25), Ex. 1 Resin (75) | 1.17 | 48 | 46 | 39 | 37 | 28 | 12 | 45 | 0.29 | 50 | 0.06 |

The effect that the new polyepoxide has on reducing the viscosities and at the same time improving the hot hardness and solvent and water resistance of the other polyepoxide is evident from the above table.

Other products having surprising properties in that they may be cured with epoxy curing agents to form hard valuable castings have also been prepared by using polyhydric phenols substituted with the ethylenically unsaturated hydrocarbon radicals in place of the above-described substituted monohydric phenols in the formation of the new ethers. This includes all polyhydric phenols, such as for example, resorcinol, bis(hydroxyphenyl) alkanes and higher hydroxyphenyl-substituted alkanes, the phenol-formaldehyde type resins, and the like.

Other products having surprising properties in that they may be cured to form hard valuable castings have also been prepared by esterification of the epoxyhydrocarbyl-substituted monohydric and polyhydric phenols.

The products mentioned in the preceding two paragraphs will be covered in copending applications.

We claim as our invention:

1. An ether of (a) an alcohol of the group consisting of alkanols of 1 to 10 carbon atoms, 5 to 6 membered-cycloalkanols of 5 to 10 carbon atoms, alkenols of 2 to 4 carbon atoms, 5 to 6 membered-cycloalkenols of 5 to 10 carbon atoms, alkanediols of 2 to 20 carbon atoms, alkoxyalkanols of a total of from 3 to 10 carbon atoms, alcohols of the formula $HO[(CH_2)_yO]_n(CH_2)_yOH$ wherein $y$ is an integer of 2 to 3, and $n$ is an integer of 6 to 8, chloroalkanols of 3 to 8 carbon atoms, vic-epoxyalkanols of 2 to 12 carbon atoms and 5 to 6 membered vic-epoxycycloalkanols of 5 to 12 carbon atoms, and (b) a monohydric phenol which is substituted on from 1 to 3 ring carbon atoms with an epoxy-containing radical of the group consisting of vic-epoxyalkyl radicals of 2 to 20 carbon atoms and vic-epoxycycloalkyl radicals of 5 to 6 carbon atoms, and on the other ring carbon atoms with a member of the group consisting of hydrogen, alkyl radicals of 1 to 5 carbon atoms, alkoxy radicals of 1 to 8 carbon atoms, methylol group, chlorine and bromine atoms.

2. An ether of (a) a vic-epoxyalkanol of 2 to 12 carbon atoms, and (b) phenol substituted on from 1 to 3 ring carbon atoms with vic-epoxyalkyl radicals of 2 to 12 carbon atoms.

3. An allyl ether of phenol which has been substituted on from 1 to 3 ring carbon atoms with vic-epoxyalkyl radicals of 2 to 12 carbon atoms.

4. An ether of (a) an alkanol of 1 to 10 carbon atoms, and (b) phenol substituted on from 1 to 3 ring carbon atoms with from 1 to 3 ring carbon atoms with vic-epoxyalkyl radicals of 2 to 12 carbon atoms.

5. An ether of (a) a vic-epoxyalkanol of 2 to 12 carbon atoms, and (b) phenol substituted on from 2 to 3 ring carbon atoms with 2,3-epoxypropyl radicals.

6. Vic-epoxyalkyl ether of 2-(2,3-epoxypropyl)phenol.

7. Glycidyl ether of 2,6-di(2,3-epoxypropyl)phenol.

8. Glycidyl ether of 2,4,6-tri(2,3-epoxypropyl)phenol.

9. Glycidyl ether of (1-methyl-1,2-epoxyethyl)phenol.

10. A polymer of the aromatic compound defined in claim 1 which contain at least two epoxy groups, said polymer being obtained by heating the aromatic compound with an epoxy curing agent of the group consisting of amines, polybasic acid anhydrides and $BF_3$ complexes.

11. A cross-linked polymer of the aromatic compound defined in claim 2 obtained by heating the compound with a polybasic acid anhydride.

12. A cross-linked polymer obtained by heating the compound of claim 5 with an epoxy curing agent of the group consisting of triethylamine, ethylene diamine, diethylamine, diethylene triamine, triethylene tetramine, dicyandiamide, melamine and meta-phenylene diamine.

13. o-(2,3-epoxypropyl)-phenyl glycidyl ether.

14. Compound of the formula

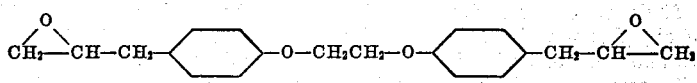

References Cited in the file of this patent

UNITED STATES PATENTS

| | | |
|---|---|---|
| 2,710,873 | Gluesenkamp | June 14, 1955 |
| 2,723,268 | Henecka | Nov. 8, 1955 |
| 2,768,182 | Burk | Oct. 23, 1956 |

OTHER REFERENCES

Fourneau et al.: Bull Soc. Chem. France (Memoirs), vol. 43, pp. 454–457 (1928).